Figure 1:
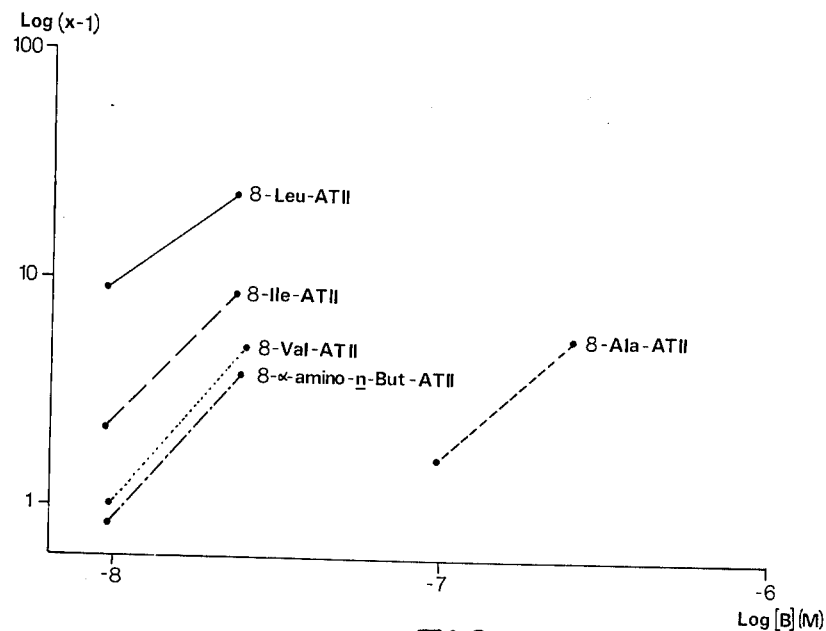

United States Patent [19]

Regoli et al.

[11] 3,907,762

[45] Sept. 23, 1975

[54] ANGIOTENSIN II POSITION 8 ANALOGS

[75] Inventors: Domenico C. Regoli, Magog; Won Kil Park, Sherbrooke, both of Canada

[73] Assignee: University of Sherbrooke, Quebec, Canada

[22] Filed: Dec. 27, 1971

[21] Appl. No.: 212,257

[52] U.S. Cl. .............................. 260/112.5; 424/177
[51] Int. Cl.² ................. C07C 103/52; A61K 37/26
[58] Field of Search .................................. 260/112.5

[56] References Cited
UNITED STATES PATENTS
3,751,404   8/1973   Sipos et al. ..................... 260/112.5
FOREIGN PATENTS OR APPLICATIONS
1,155,925   6/1969   United Kingdom............. 260/112.5

OTHER PUBLICATIONS

Park et al., Brit. J. Pharmacol., 43(2), 418 (Oct. 71).
Catt, Lancet, 1, 827 (1970).
Khairallah et al., J. Med. Chem., 13, 181 (1970).
Chaturvedi et al., J. Med. Chem., 13, 177 (1970).
Jorgensen et al. I, J. Med. Chem. 13, 352 (1970).
Jorgensen et al. II, J. Med. Chem., 13, 744 (1970).

*Primary Examiner*—Elbert L. Roberts
*Assistant Examiner*—Reginald J. Suyat
*Attorney, Agent, or Firm*—Cushman, Darby & Cushman

[57]           ABSTRACT

The present invention relates to novel angiotensin II derivatives which are particularly useful in inhibiting the action of angiotensin I and II.

3 Claims, 4 Drawing Figures

ANGIOTENSIN_II POSITION 8 ANALOGS

PRIOR ART

Angiotensin_I and II are natural substances corresponding respectively to the following formulae:

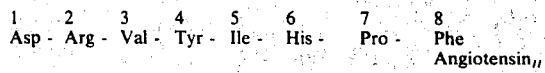

Angiotensin_II and

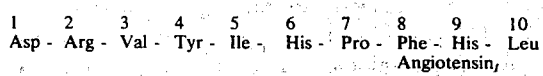

Angiotensin_I

Recently, both antiotensins have been classified as hormones (Catt. K. J.: LANCET 1 : 827, 1970). It has also been found that they are liberated in the blood through the action of an enzyme of renal origin (renin) on a plasmatic protein known as angiotensinogen. Amongst the biological effects of angiotensin_II there may be mentioned the vasoconstricting effect which is considered most important to maintain suitable levels of arterial pressure or to produce hypertension. In view of this, the angiotensins have consequently been considered as one of the pathogenic factors causing arterial hypertension.

A further physiological effect of angiotensins is their ability to stimulate the liberation of aldosterone from the adrenal cortex. The hypersecretion of aldosterone can cause a retention of sodium ions and water with accumulation of fluids in the extracellular space; this type of retention being known as oedema.

More recently, it has been found that angiotensins can stimulate the liberation of catecholamine from the adrenal glands in man and in animals (Feldberg et al: J. Physiol. 171 : 98, 1964). Further angiotensins are suspected to play an undesirable role in the central nervous system and the sympathetic nervous system.

Many substances have been tried as antagonists for angiotensins without satisfactory results, for example, lidophlazine, guancidine and osajin. Though these substances reduce the activity of angiotensins in tissues or animals, the antagonism is neither specific nor competitive. The antagonism is mainly due to the property of these substances to depress the biological response of the tissues rather than specifically antagonise the response to angiotensins.

Accordingly, because of the pathogenetic role of angiotensins in hypertensive and oedematic diseases it has been found highly desirable to develop pharmacological antagonists of angiotensins for blocking the undesirable action of angiotensins.

THE INVENTION

In accordance with the present invention it has been found that certain novel analogues of angiotensin_II are capable of acting as antagonists of angiotensins.

The novel analogues of angiotensin_II correspond to the general formula:

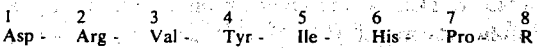

wherein
R is Leu (leucine),
Ile (isoleucine),
Val (valine), or
α-amino-n-But (α-amino-n-butyric acid) and Asp is aspartyl, Arg is arginyl, Val is valyl, Tyr is tyrosyl, Ile is isoleucyl, His is histidyl and Pro is prolyl.

The compounds of the present invention have been found to be potent antagonists of angiotensin_II while maintaining little direct pressor effect, and with the exception of 5-Ile-8-Ile Angiotensin_II they are almost devoid of myotropic activity. The compounds are up to 10 times more potent than the recently published 8-Ala-Angiotensin_II, Turker et al, Europ. J. Pharmacol. 15 : 285, 1971 and Park et al, Brit. J. Pharmacol. 43 : 418, 1971.

The compounds of the present invention are competitive inhibitors of Angiotensin_I and II while two of them, 5-Ile-8-Ile Angiotensin_II and 5-Ile-8-Leu-Angiotensin_II, have relatively prolonged action in vivo.

PREPARATION OF COMPOUNDS

The compounds of the present invention are prepared by the method of Merrifield described in J. Am. Chem. Soc. 85 : 2149, 1963. In order to build up the peptide chain the various amino acids must first be blocked to ensure the interlinkage. This is done by forming the butyloxycarbonyl (Boc) derivative of the amino acid at the C-terminal. This is done generally by reacting each amino acid with t-butoxycarbonylazide as described by Schwyzer et al in Helv. Chim. Act 42 : 2622, 1959. In accordance with this procedure the following protected amino acids were prepared: Boc-leucine-$H_2O$, Boc-proline, Boc-isoleucine, Boc-valine and Boc-nitro-arginine. Other protected amino acids readily available from Mann Research Laboratory, New York, U.S.A. are Boc-imidazol-benzyl-histidine, Boc-O-benzyl-tyrosine and Boc-β-benzyl-aspartic acid.

In the first linkage step the amino acid desired in the 8-position is combined with chloromethylated copolystyrene - 2% divinylbenzene (available from Mann Research Laboratory, New York, U.S.A.). The amino acid can be Boc-leucine-$H_2O$, Boc-valine, Boc-α-amino-n-butyric acid or Boc-isoleucine. This reaction is carried out in the presence of a solvent made up of triethylamine in absolute ethanol and ether to provide the starting Boc-leucine-polymer.

The Boc-leucine polymer is then coupled with the next Boc-amino acid, namely Boc-proline, through a series of cycles involving deprotection, neutralization and coupling with N,N'-dicyclohexylcarbodiimide. Briefly, the Boc group is cleaned with 1N HCl in glacial acetic acid, and the leucine-polymer obtained is neutralized with triethylamine. Then the Boc-proline is added with N,N'-dicyclohexylcarbodiimide to form the Boc-proline-leucine-polymer. This series of deprotection, neutralization and coupling is then repeated with each protected amino acid until the protected 8-leu-angiotensin_II derivative is obtained.

The desired Aspartyl-arginyl-valyl-tyrosyl-isoleucyl-histidyl-prolyl-leucine also referred to as (5-Ile-8-Leu)-angiotensin_II is then obtained by bubbling hydrogen bromide in anhydrous trifluoroacetic acid through the protected octapeptide whereby the polymer is removed and the remaining protective groups are removed by reduction with hydrogen using palladium black as catalyst. The purified polypeptide is obtained by chromatography on a column of Sephadex G-25 using n-butanolacetic acid-water (BAW) as the solvent. The average yield for each angiotensin$_{II}$ derivative prepared varies between 50 to 65% based on the mmoles of C-terminal amino acid esterified on the polymer.

There is thus obtained the L-aspartyl-L-arginyl-L-valyl-L-tyrosyl-L-isoleucyl-L-histidyl-L-prolyl-L-α-amino-n-butyric acid, the L-aspartyl-L-arginyl-L-valyl-L-tyrosyl-L-isoleucyl-L-histidyl-L-proline-L-valine, the L-aspartyl-L-arginyl-L-valyl-L-tyrosyl-L-isoleucyl-L-histidyl-L-prolyl-L-isoleucyne and L-aspartyl-L-arginyl-L-valyl-L-tyrosyl-L-isoleucyl-L-histidyl-L-prolyl-L-leucine.

EXAMPLE 1

Aspartyl-arginyl-valyl-tyrosyl-isoleucyl-histidyl-prolyl-leucine (5-Ile-8-Leu) angiotensin$_{II}$ A. Preparation of Boc-Leucine-H$_2$O Leucine (2.62 g, 20.0 mmoles) and magnesium oxide (1.65 g, 41.0 mmoles) were ground together in a mortar to give a small particle size. The mixture was stirred in a round bottom flask for two hours at room temperature and suspended in 70 ml of 50% aqueous dioxane. t-Butoxycarbonylazide (42.0 mmoles) was added, and the mixture stirred at room temperature for 40 hours and added to 100 ml of cold water. The insoluble residue was removed by filtration and the filtrate extracted with ether (3×70 ml) and the organic layer discarded. The aqueous phase was bubbled with N$_2$ gas to remove ether and cooled in an ice-bath, brought to pH 3 to 4 with cold 50% citric acid. The acidified suspension was extracted with four times 100 ml portions of ethylacetate. The combined extracts were washed with saturated NaCl and after drying over anhydrous Na$_2$SO$_4$, the ethylacetate was removed under vacuum. The residue was crystallized from ethanol by addition of water. Recrystallization from 50% ethanol yield — 85% of the pure product.

The compound was dried to a white crystal, not hygroscopic and soluble in organic solvents. Insoluble in water. Boc-proline, Isoleucine, Valine (NO$_2$) Arginine, are prepared as described and yield 75–90% of the desired Boc-amino acid.

B. Boc-Leucine-Polymer

A solution of 0.754 g (3 mmoles) Boc-leucine-H$_2$O and 0.42 ml (3 mmoles) of triethylamine in 20 ml of absolute ethanol and ethylacetate (1:1) mixture was added to 3.0 g of the chloromethylated copolystyrene 2% divinylbenzene. The mixtue was stirred with a magnetic stirrer under reflux at 80°–90°C for 24 hours. The esterified polymer was collected by filtration, washed with absolute ethanol-ethylacetate (1:1) mixture (100 ml), absolute ethanol (100 ml), water (100 ml) and absolute methanol (120 ml) and then dried under vacuum over P$_2$O$_5$ and paraffin.

The amino acid analysis showed this substituted polymer to contain 0.52 mmoles of Boc-leucine/g of polymer.

C. t-Butyloxycarbonyl-β-benzyl-aspartyl-nitro-arginyl-valyl-O-benzyl-tyrosyl-isoleucyl-imidazol-benzyl-histidyl-prolyl-leucine polymer The Boc-leucine polymer (3.0 g, 1.56 mmoles) was placed in the reaction vessel (Park and Regoli, 1971) and the following cycle of deprotection, neutralization, and coupling was used to introduce each new residue: (1) washed with glacial acetic acid (3 × 50 ml); (2) Boc group was cleaved by 1.1N Hcl in glacial acetic acid (40 ml) for 40 min.; (3) washed with glacial acetic acid (3 × 50 ml); (4) washed with absolute ethanol (3 × 50 ml); (5) washed with dimethylformamide (DMF) (3 × 50 ml); (6) the hydrochloride neutralized with 8 ml of triethylamine in 45 ml of DMF for 10 min.; (7) washed with DMF (3 × 50 ml); (8) washed with methylene chloride (3 × 50 ml); (9) introduced 4 mmoles of the appropriate Boc-amino acid in 45 ml of methylene chloride and allowed to mix for 10 min.; (10) introduced 4.2 mmoles of N,N'-dicyclohexylcarbodiimide (Aldrich Chemical Co., Wis., U.S.A.) in 5 ml of methylene chloride and the reaction mixture was shaken for 3 hours at room temperature and let stand in cold room overnight; (11) washed with methylene chloride (3 × 50 ml); (12) washed with absolute ethanol (3 × 50 ml). For Boc-nitro-arginine, and Boc-imidazolbenzyl-histidine, step 8 was deleted and DMF was substituted for methylene chloride in steps 9–11. The protected octapeptide with polymer was dried in a desiccator over KOH, P$_2$O$_5$, and paraffin in vacuo, dried weight: 4.7 g.

D. Aspartyl-arginyl-valyl-tyrosyl-isoleucyl-histidyl-prolylleucine (5-Ile, 8-Leu)-angiotensin$_{II}$ The protected octapeptide (3.0 g) was suspended in 50 ml of anhydrous trifluoroacetic acid and HBr gas bubbled slowly through the suspension with occasional shaking for 50 min. at room temperature and under anhydrous condition. The reaction mixture was filtered and the polymer was washed (3 × 10 ml) with anhydrous trifluoroacetic acid. The volume of the combined filtrate was reduced in vacuo at 20°. The peptide was precipitated by addition of anhydrous ether.

It was removed by filtration and washed with anhydrous ether several times. The partially protected octapeptide (1.59 g, 1.2 mmoles) was dissolved in 60 ml of mixed solvent methanol-acetic acid-water (10:3:1) and hydrogen was bubbled through the solution at atmospheric pressure for 38 hours using palladium black (1.9 g) as catalyst. The catalyst was removed by filtration and washed with the same solvent mixture (20 ml). The combined filtrates were evaporated to dryness in vacuo at 20°. The residue was purified by chromatography on a column (4.5 × 80 cm) of Sephadex G-25 coarse, using n-butanol-acetic acid-water (4:1:5) as the solvent. Fraction of 10 ml each were collected, and from fraction 118–191 inclusive, 890 mg of peptide were obtained which was washed several times with anhydrous ether and dried over P$_2$O$_5$, paraffin and KOH in vacuo. The yield is based on 1.56 mmoles of Boc-leucine which was esterified on the polymer.

Physical properties: white powder, soluble in water (2 mg/ml), insoluble in organic solvents. Analysis of the compound gave the following results:

mp 242°–245°, PC; Rf (BAW) 0.48, Rf (BAPW) 0.45, TLC; Rf (BAW) 0.40, Rf (BAPW) 0.63, E$_G$ — 1.13. Amino acid ratios on an acid hydrolysate; Asp, 1.02; Arg, 0.98; Val, 1.00; Tyr, 0.95; Ile, 1.00; His, 0.93; Pro, 1.04; Leu, 1.03. Anal. C$_{47}$H$_{73}$N$_{13}$O$_{12}$. 2 H$_2$O (1048.19); C, 53.85; H,7.41; N,17.37. Found: C, 53.28; H,7.26; N, 17.82.

In the above mp is melting point, PC is paper chromatography, TLC is thin layer chromatography, E$_G$ is electrophoretic mobility, BAW is as defined previously, BAPW is n-butanol-acetic acid-pyridine water (30:6:24:20).

EXAMPLE 2

L-Aspartyl-L-arginyl-L-valyl-L-tyrosyl-L-isoleucyl-L-histidyl-L-prolyl-L-α-amino-n-butyric acid 5-Ile; 8-L-α-amino-n-butyric acid)-angiotensin$_{II}$ By following the procedure of Example 1 and starting with Boc-L-α-amino-n-butyric acid instead of Boc-leucine-H$_2$O the above product is obtained. Analysis of the compound gave the following results:

mp 245° – 247°, PC; Rf (BAW) 0.39, (BAPW) 0.33; TLC: Rf (BAW) 0.26 Rf (BAPW) 0.57, E$_G$ — 1.20. Amino acid ratios on an acid hydrolysate; Asp, 1.05; Arg, 1.07; Val, 1.00; Tyr, 0.97; Ile, 1.00; His, 1.03; Pro, 0.98; α-amino-n-butyric acid, 1.02; Anal. C$_{45}$H$_{69}$N$_{13}$O$_{12}$.2 H$_2$O (1020.11): C, 52.98; H, 7.21; N, 17.85; Found: C, 53.02; H, 7.35; N, 17.96.

EXAMPLE 3

L-aspartyl-L-arginyl-L-valyl-L-tyrosyl-L-isoleucyl-L-histidyl-L-prolyl-L-valine 5-Ile-5-val)-angiotensin$_{II}$ By following the procedure of Example 1 and starting with Boc-L-valine instead of Boc-leucine-H$_2$O the above product was obtained. Analysis of the compound gave the following results:

mp 199°–201°, PC; Rf (BAW) 0.45, Rf (BAPW) 0.40, TLC: Rf (BAW) 0.38, Rf (BAPW) 0.58, E$_G$ — 1.17. Amino acid ratios on an acid hydrolysate; Asp, 1.01; Arg, 1.05; Val, 2.06; Tyr, 0.96; Ile, 1.00; His, 0.98; Pro, 1.00. Anal. C$_{46}$H$_{71}$N$_{13}$O$_{12}$.CH$_3$COOH H$_2$O (1076.23); C, 53.56; H, 7.22; N, 16.92 Found: C, 53.41; H, 7.14; N, 17.08.

EXAMPLE 4

L-aspartyl-L-arginyl-L-valyl-L-tyrosyl-L-isoleucyl-L-histidyl-L-prolyl-L-isoleucine 5-Ile, 8Ile)-angiotensin$_{II}$ By following the procedure of Example 1 and starting with Boc-isoleucine instead of Boc-leucine-H$_2$O the above product is obtained. Analysis of the compound gave the following results:

mp 230°–234°, PC; Rf (BAW) 0.46, Rf (BAPW) 0.47, TLC; Rf (BAW) 0.36, Rf (BAPW) 0.68, E$_G$ — 1.14. Amino acid ratios on an acid hydrolysate; Asp, 0.98; Arg, 0.96; Val, 1.00; Tyr, 0.92; Ile, 2.04; His, 0.95; Pro, 1.00.

PHARMACOLOGY

The products of the present invention have been tested for their potency on blood pressure, their myotropic effect on isolated organs, their antagonistic value in vivo and in vitro. Tests were made against angiotensin$_{II}$. The antagonistic potencies of the compounds of the present invention were compared with that of 8-alanine angiotensin$_{II}$, the latter compound having been described in Turker et al, Europ. J. Pharmacol. 15: 285, 1971 and Park et al, Brit. J. Pharmacol. 43: 418, 1971.

The results of these tests are found in the graphs, wherein:

FIG. 1 shows the pressor effects of angiotensin (AT$_{II}$) and analogues on the blood pressure of nephrectomized rats, anesthetized with urethane. The points are means ± S.E. (vertical bars) of 6 experiments. Abscissa: Log of the i.v. injected dose in g/kg Ordinate: Increase of blood pressure in mm Hg.

Figure 2:
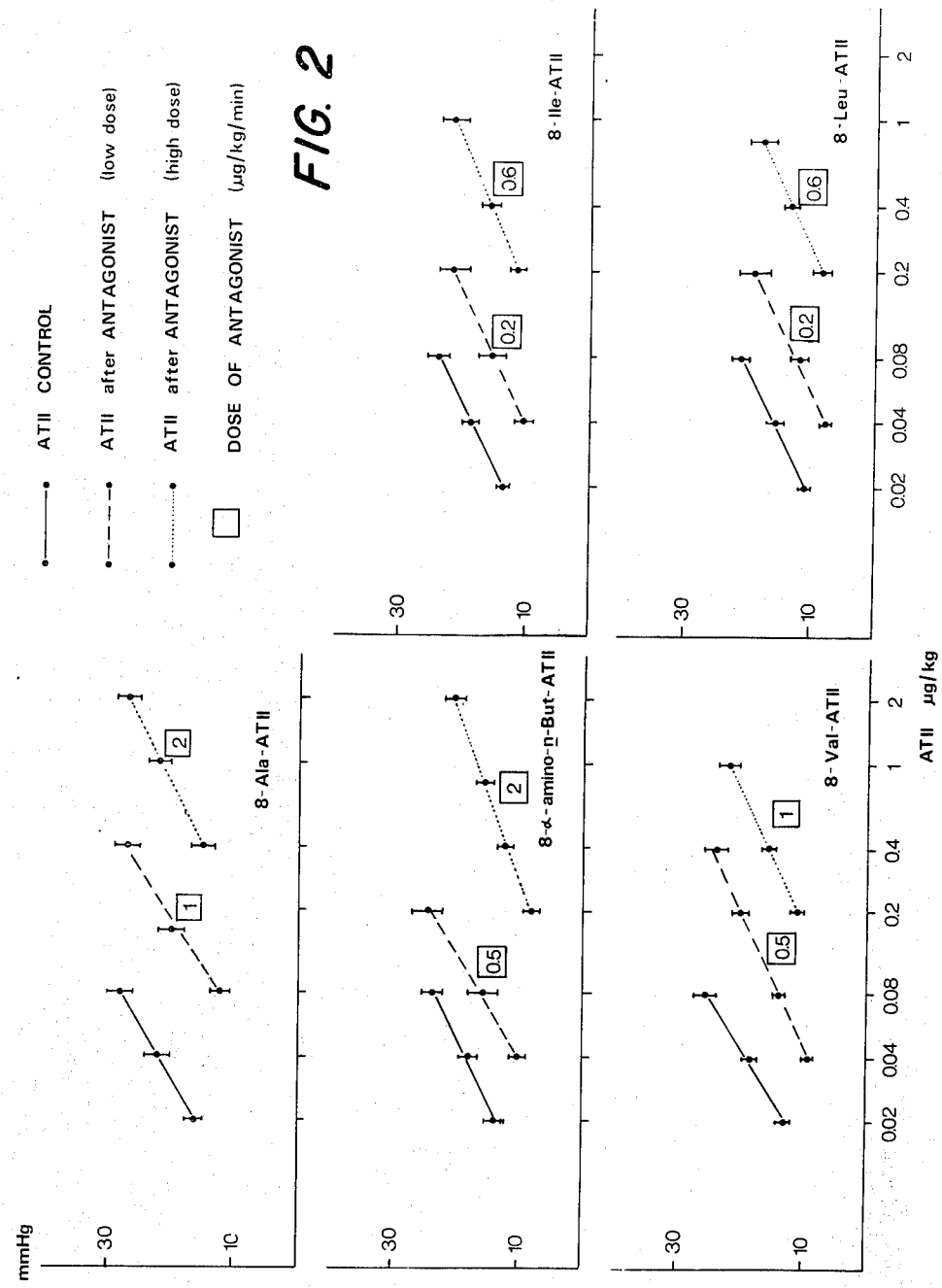

FIG. 2 shows the log dose response curves of AT$_{II}$ on the rat blood pressure, in absence (continuous line) and in presence of 8-substituted analogues. Points represent the means of 6 experiments and vertical bars the S.E. Abscissa: Dose of injected angiotensin in µg/kg. Ordinate: Increase of blood pressure in mm Hg.

Figure 3:
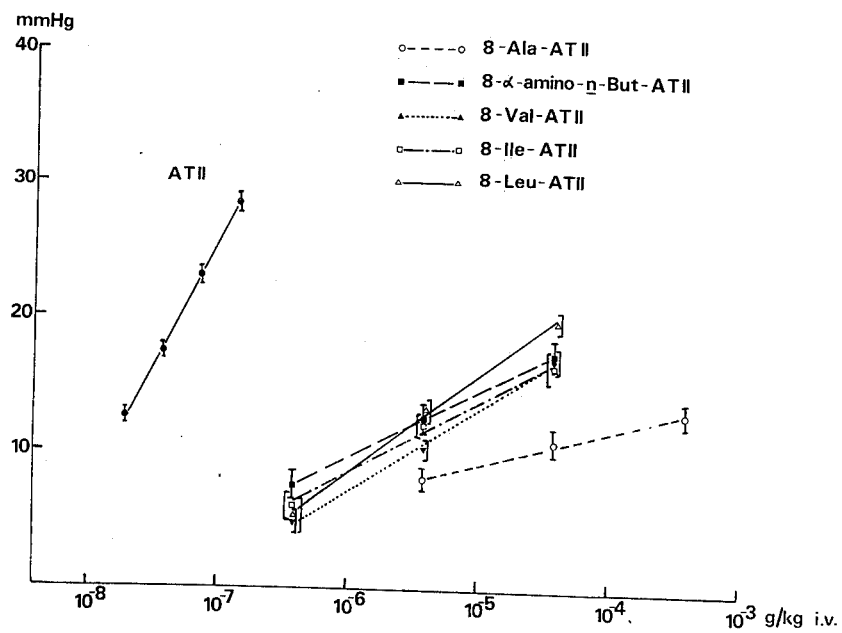

FIG. 3 shows the myotropic effect of angiotensin (AT$_{II}$) in the absence (continuous line) and in the presence of increasing concentrations of antagonists. Points indicate means and vertical bars S.E. of at least 3 experiments. (FIG. 3 is found on the same sheet as FIG. 1). Abscissa: Molar concentration of AT$_{II}$. Ordinate: % of maximal response.

Figure 4:
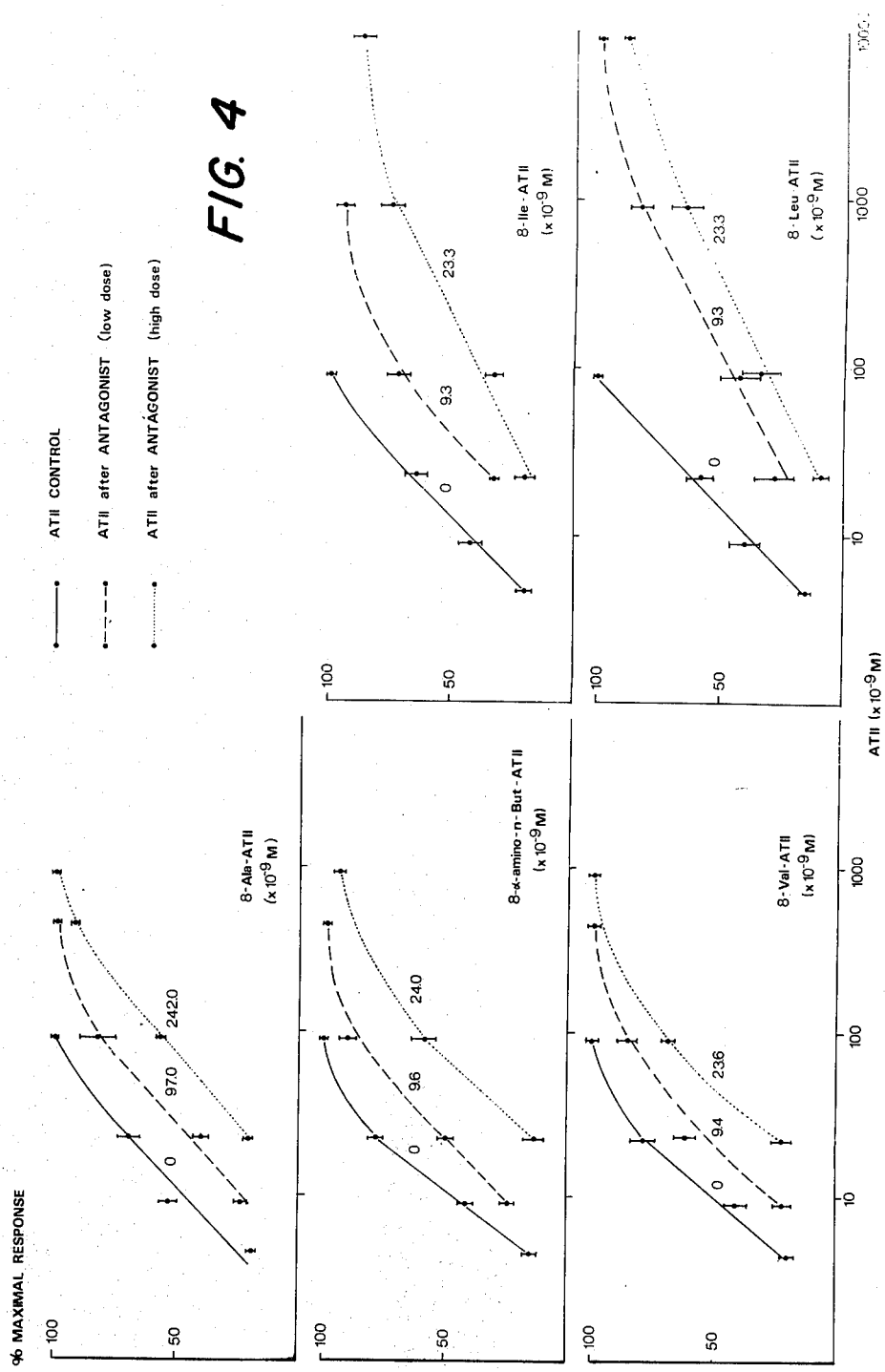

FIG. 4 shows the log-log plots of dose ratios -1 (log(x-1)) against molar concentration of antagonist [B]. For each antagonist, the two points were calculated from the middle point (50% of maximum effect) of the curves reported in FIG. 3.

METHODS

Direct effects and antagonistic potencies were tested in vivo (on the rat blood pressure) and in vitro (on the rat isolated stomach strip).

Rat Blood Pressure

Male albino rats (250–300 g), nephrectomized 24 hours before were anesthetized with urethane (1.4 g/kg s.c.). Blood pressure was recorded directly from the carotid artery with a mercury manometer and injections of the standard (5-Ile-angiotensin II) or of the new compounds were given into the jugular vein to measure the direct pressor effect. For testing of antagonism, the standard doses of AT$_{II}$ were given before, during and after the intravenous infusion of one of the analogues. The infusions were administered through the femoral vein at a constant rate of 0.05 ml/min.

Rat Isolated Stomach Strip

All experiments were preformed on rat stomach strips, suspended in a cascade system and superfused with 10 ml/min. of oxygenated (95%–O$_2$ and 5% — CO$_2$) Krebs solution at 37°C. The contractions were recorded with an isotonic transducer and registered on a Harvard apparatus. A tension of 1.5 – 2 g was applied to the tissues. Maximal responses were obtained at the beginning of every experiment with a large dose (5–10 times higher than the ED-50) of standard 5-Ile-angiotensin II. Suitable doses of the standard were then given on order to obtain a curve dose response: thereafter, the antagonist was added to the perfusing fluid and the curve dose response of 5-Ile-angiotensin II was repeated: if some antagonism was present, the doses of angiotensin II were increased to obtain maximum effect in the presence of antagonist.

The compounds used in the experiments are shown in table I.

TABLE I

|   | 1    | 2    | 3    | 4    | 5    | 6    | 7   | 8                                      |
|---|------|------|------|------|------|------|-----|----------------------------------------|
|   | Asp- | Arg- | Val- | Tyr- | Ile- | His- | Pro-| Phe  $AT_{II}$ (5-Ile-$AT_{II}$)       |
| I | Asp- | Arg- | Val- | Tyr- | Ile- | His- | Pro-| Ala (5-Ile-8-Ala-$AT_{II}$)            |
| II| Asp- | Arg- | Val- | Tyr- | Ile- | His- | Pro-| n-But (5-Ile-8-α-amino-n-But-$AT_{II}$)|
|III| Asp- | Arg- | Val- | Tyr- | Ile- | His- | Pro-| Val (5-Ile-8-Val-$AT_{II}$)            |
| IV| Asp- | Arg- | Val- | Tyr- | Ile- | His- | Pro-| Ile (5-Ile-8-Ile-$AT_{II}$)            |
| V | Asp- | Arg- | Val- | Tyr- | Ile- | His- | Pro-| Leu (5-Ile-8-Leu-$AT_{II}$)            |

The results are expressed as mean ± S.E. Statistical significance was calculated with a student's t-test for paired data.

RESULTS

Rat Blood Pressure

In a first series of experiments, increasing amounts of the analogues were injected intravenously to compare their pressor effects with those of standard $AT_{II}$. Results are summarized in FIG. 1.

8-Ala-$AT_{II}$ is almost inactive even when give in amounts 10,000 times higher than the minimum dose of $AT_{II}$. The curve dose responses for the other 4 compounds lie between that of $AT_{II}$ and that of 8-Ala-$AT_{II}$ and do not show any significant difference between each other. Moreover, the log dose response curves are not parallel to that of $AT_{II}$. The pressor effect of 8-α-amino-n-But-$AT_{II}$ and 8-Val-$AT_{II}$ is quickly reversible like that of $AT_{II}$: on the contrary, the increase of blood pressure eliced by 8-Ile-$AT_{II}$ and 8-Leu-$AT_{II}$ lasts for about 7–15 min., especially when high doses (around $10^{-5}$ g/kg) are administered.

In a second series of experiments, the analogues were tested for antagonism to $AT_{II}$: the results are shown in FIG. 2.

Log dose response curves of $AT_{II}$ are shifted to the right when the agonist is administered in the presence of the 5 compounds (I to V), shown in table I.

The displacement of the curve is proportional to the amount of antagonist used and the log dose response curves remain parallel with each other. Antagonistic potencies of the analogues increase with the length of the aliphatic chain of the amino acid substituted in position 8. This is particularly evident for 8-Ile-$AT_{II}$ and 8-Leu-$AT_{II}$, which are approximately 4 times more potent than 8-Ala-$AT_{II}$. The other two compounds (8-α-amino-n-But-$AT_{II}$ and 8-Val-$AT_{II}$) are as potent as 8-Ala-$AT_{II}$ in vivo.

TABLE II

Antagonism of the pressor effect of $AT_{II}$ by various 8 substituted analogues of $AT_{II}$. Means and S.E. of 6 experiments in bilaterally nephrectomized rats.

| Antagonist | Agonist inj. μg/kg | Before | During | AFTER 30' | 90' |
|---|---|---|---|---|---|
|  | $AT_{II}$ 0.2 | 16.5 ± 1.0 | — | 13.2 ± 1.2 |  |
| 8-Ala-$AT_{II}$ | 0.8 | 25.0 ± 2.1 | 9.0 ± 0.9 ** | 21.0 ± 2.0 |  |
| (2 μg/kg/min.) | 2.0 | — | 12.0 ± 1.3 |  |  |
|  | 4.0 | — | 15.0 ± 1.1 |  |  |
|  | 0.2 | 10.7 ± 0.9 | — | 12.4 ± 1.4 |  |
| 8-α-amino-n- | 0.8 | 19.5 ± 1.1 | 5.0 ± 0.3 *** | 20.2 ± 1.8 |  |
| But-$AT_{II}$ | 2.0 | — | 8.0 ± 0.7 |  |  |
| (2 μg/kg/min.) | 4.0 | — | 12.3 ± 0.7 |  |  |
|  | 8.0 | — | 15.3 ± 0.8 |  |  |
|  | 0.2 | 16.2 ± 0.9 | — | 9.0 ± 0.5 ** |  |
| 8-val-$AT_{II}$ | 0.8 | 30.5 ± 1.5 | 9.0 ± 0.8 | 12.5 ± 1.0 |  |
| (1 μg/kg/min.) | 2.0 | — | 11.0 ± 0.7 |  |  |
|  | 4.0 | — | 15.8 ± 1.2 |  |  |
|  | 8.0 | — | 22.0 ± 1.6 |  |  |
|  | 0.2 | 12.4 ± 1.2 | — | 5.8 ± 0.9 *** | 10.6 ± 0.8 |
| 8-Ile-$AT_{II}$ | 0.8 | 22.2 ± 1.2 | 7.4 ± 0.9 *** | 14.5 ± 0.3 *** | 20.8 ± 1.2 |
| (0.6 μg/kg/min.) | 2.0 | — | 11.4 ± 1.3 |  |  |
|  | 4.0 | — | 15.4 ± 1.7 |  |  |
|  | 8.0 | — | 21.2 ± 2.4 |  |  |
|  | 0.2 | 10.2 ± 0.9 | — | 5.5 ± 0.7 | 9.3 ± 0.9 |
| 8-Leu-$AT_{II}$ | 0.8 | 17.8 ± 1.6 | — | 8.5 ± 0.5 *** | 18.8 ± 1.8 |
| (0.6 μg/kg/min.) | 2.0 | — | 8.5 ± 1.3 |  |  |
|  | 4.0 | — | 13.3 ± 9.1 |  |  |
|  | 8.0 | — | 12.8 ± 7.9 |  |  |

Significance of differences between pressor effects of $AT_{II}$ observed before and during infusion of the antagonist are given by  = P < 0.01 and * = P < 0.001

Antagonistic effects of 8-Ala and 8-α-amino-n-But-$AT_{II}$ are rapidly reversible (in less than 30 min.) while 8-Val-$AT_{II}$ and even more 8-Ile and 8-Leu-$AT_{II}$ depress the response to angiotensin for 60 or 90 min. (table II). This indicates that lengthening of the aliphatic chain in position 8 may allow the compound to form a slowly reversible binding with the receptors. These interpretations are supported by the duration of the pressor effect with high doses of 8-Ile-$AT_{II}$ and 8-Leu-$AT_{II}$ (mean duration of pressor effect (20 mm Hg) in minutes corresponds to 2.7 ± 0.2 min. for $AT_{II}$; 4.1 ± 0.4 min. for 8-Ile-$AT_{II}$ and 14.6 ± 4.4 min. for 8-Leu-$AT_{II}$). These results are means ± S.E. of 6 experiments.

Rat Isolated Stomach Strip

For a more precised evalation of the interactions between angiotensin II and the new compounds at the receptor's level, isolated rat stomach strips were used. As reported before (Regoli et al, Brit. J. Pharmacol. 23: 351, 1964), rat stomach strip is relatively sensitive to angiotensin II. In a cascade superfusion system, using oxygenated Krebs solution, the tissue does not show any important spontaneous activity: the responses to short infusions (3 min.) of increasing doses of $AT_{II}$ consist of rapid contractions which remain constant at the maximum level obtainable with the dose. The responses are rapidly reversible after stopping the infusion. Sensitivity to angiotensin remains constant for several hours.

The compounds reported in table I were tested on this preparation for the direct myotropic effect and for antagonism against angiotensin II and 5-hydroxytryptamine. The direct effect was evaluated as a percent of maximal response obtainable with very high doses of each compound. As shown in Table III, 8-Ile-$AT_{II}$ maintains 30% of the intrinsic activity of $AT_{II}$, while 8-Leu-$AT_{II}$ has only 10% and the other 3 compounds are almost inactive.

TABLE III

Drug parameters of $AT_{II}$ and analogues tested on rat isolated stomach strip).

| COMPOUND | $\alpha^E$* | $pD_2$* | $pK_B$** |
|---|---|---|---|
| $AT_{II}$ | 1.0 | 7.9 | — |
| 8-Ala-$AT_{II}$ | 0 | — | 7.22 |
| 8-α-amino-n-But-$AT_{II}$ | 0.06 | — | 8.04 |
| 8-Val-$AT_{II}$ | 0.06 | — | 7.94 |
| 8-Ile-$AT_{II}$ | 0.3 | — | 8.36 |
| 8-Leu-$AT_{II}$ | 0.1 | — | 9.03 |

*$\alpha^E$ = intrinsic activity and $pD_2$ (apparent affinity) according to Arlens, 1964
**$pK_B$ (−log $K_B$) has been calculated by the equation $$K_B = \frac{[B]}{x-1}, \text{ according to Furchgott, 1967}$$

To test the antagonism, the compounds II-V of Table I were added to the Krebs solution in concentration of 10 and 25 × 10⁻⁹ M. Ten minutes after beginning of the infusion, angiotensin was given again and the dose was increased to obtain full contraction. The results are summarized in FIG. 3.

8-Ala-$AT_{II}$, 8-α-amino-n-But-$AT_{II}$ and 8-Val-$AT_{II}$ displace the log dose response curve of the agonist to the right: the curves remain parallel and do not show any important depression of the maximal response. Compounds II and III are about 10 times as active as 8-Ala-$AT_{II}$ (FIG. 4). Compounds IV and V have an even stronger antagonistic potency and change significantly the slope of the log dose response curves. Moreover, after high concentrations of 8-Ile-$AT_{II}$ and 8-Leu-$AT_{II}$, the maximal response is slightly depressed (maximal residual response = 87% after 8-Ile-$AT_{II}$ and 89% after 8-Leu-$AT_{II}$). $p^K_B$ (see Table III) calculated from the log dose response curves, obtained in the presence of low concentrations of antagonists, is significantly higher for 8-Leu-$AT_{II}$ and is increased for 8-Ile-$AT_{II}$. The ratio agonist/antagonist and the percent of inhibition of $AT_{II}$ for the 5 compounds are presented in Table IV.

TABLE IV

Inhibition (%) of the myotropic activity of $AT_{II}$ and 5-HT on isolated rat stomach strip, by various 8 substituted analogues of $AT_{II}$.

| ANTAGONIST | AGONIST | RATIO AG/ANT. | % INHIBITION (mean ± S.E.) | |
|---|---|---|---|---|
| 8-Ala-$AT_{II}$ | $AT_{II}$ | 0.1 | 34 ± 4 | (6) |
| | | 1 | 17 ± 6 | (3) |
| | | 5 | 0 | (3) |
| | 5-HT | 0.004 | 0 | (3) |
| | | 0.2 | 0 | (3) |
| 8-α-amino-n-But-$AT_{II}$ | $AT_{II}$ | 1 | 39 ± 7 | (7) |
| | | 10 | 10 ± 4 | (3) |
| | | 50 | 2 ± 1 | (3) |
| | 5-HT | 0.02 | 0 | (3) |
| | | 2 | 0 | (3) |
| 8-Val-$AT_{II}$ | $AT_{II}$ | 1 | 36 ± 3 | (6) |
| | | 10 | 15 ± 4 | (3) |
| | | 50 | 0 | (3) |
| | 5-HT | 0.04 | 0 | (3) |
| | | 2 | 0 | (3) |
| 8-Ile-$AT_{II}$ | $AT_{II}$ | 1 | 44 ± 4 | (3) |
| | | 10 | 28 ± 4 | (3) |
| | | 100 | 5 ± 3 | (3) |
| | 5-HT | 0.04 | 4 ± 1 | (3) |
| | | 2 | 0 | (3) |
| 8-Leu-$AT_{II}$ | $AT_{II}$ | 1 | 55 ± 3 | (3) |
| | | 10 | 47 ± 4 | (3) |
| | | 100 | 17 ± 4 | (3) |
| | 5-HT | 0.04 | 0 | (3) |
| | | 2 | 0 | (3) |

In parenthesis, the number of individual determination.

This table reports also the absence of inhibition of 5-hydroxytryptamine. The fact that 50% of inhibition of $AT_{II}$ is obtained with 8-Leu-$AT_{II}$ and 44% for 8-Ile-$AT_{II}$ at the ratio agonist/antagonist of 1, indicates that two molecules of antagonist (8-Leu-$AT_{II}$ and 8-Ile-$AT_{II}$) are enough to prevent the action of one molecule of $AT_{II}$. The absence of parallelism and the depression of the maximum effect after high doses of IV and V are suggestive for a slow dissociation from the receptors. This is confirmed by the high value of $p_B^K$ for 8-Leu and 8-Ile-$AT_{II}$ (see Table III).

TOXICITY STUDIES

The antagonists of angiotensin I and II described in the present application are useful for studying the physiological and pathological roles of an important hormonal system the renin-angiotensins.

Applications in humans will be carried on by administering the compounds intravenously for relatively short periods of time (60–120 min.) because of the short half-life of the compounds. This type of application requires the control of the acute toxicity of the compounds in animals.

In view of the application in humans, several toxicity studies were performed.

The four compounds were administered intravenously (i.v.) at high doses to three animal species: rabbits (up to 5 mg/kg of each compound), rats (up to 20 mg/kg) and mice (up to 20 mg/kg).

The animals were watched during 6 hours following the i.v. administration to detect symptoms and signs of acute toxicity. The survival and the increase of the body weight were measured during 15 days following the i.v. administration, and compared with a control group (n= 10).

The results of one of these experiments using 5-Ile-8-Leu-angiotensin II are summarized in Table V.

TABLE V

Acute toxicity of 5-Ile-8-Leu-AT$_{II}$.

| Species | n | Dose of compound | Acute symptoms | Survival after 15 days | Body weight* | Skin test | ED-50 |
|---------|---|------------------|----------------|------------------------|--------------|-----------|-------|
| Rabbit | 10 | 5 mg/kg i.v. | none | 100% | −2.5 g N.S. | Negative | 0.5 µg/kg |
| Rat | 10 | 20 mg/kg i.v. | " | 100% | −1.0 g N.S. | — | 0.2 µg/kg |
| Mice | 10 | 20 mg/kg i.v. | " | 100% | −0.5 g N.S. | — | 0.2 µg/kg |

*(Mean increase with respect to control groups)
N.S. = Statistically not significant.

The other three compounds (5-Ile-8-α-amino-n-But-angiotensin II, 5-Ile-8-Val-angiotensin II and 5-Ile-8-Ile-angiotensin II) have similar effects to those shown for 5-Ile-8-Leu-angiotensin II.

We claim:

1. As new derivatives of Angiotensin$_{II}$ the L epimers corresponding to the general formula:

| 1 | 2 | 3 | 4 | 5 | 6 | 7 | 8 |
|---|---|---|---|---|---|---|---|
| Asp - | Arg - | Val - | Tyr - | Ile - | His - | Pro - | R | wherein
 Asp is aspartyl
 Arg is arginyl
 Val is valyl
 Tyr is tyrosyl
 Ile is isoleucyl
 His is histidyl
 Pro is prolyl, and
 R is a radical selected from the group consisting of, valine and α-amino butyric acid.

2. The compound of claim 1 wherein R is valine.

3. The compound of claim 1 wherein R is α-amino butyric acid.

* * * * *